Dec. 24, 1963  H. H. CHAMBERS ETAL  3,114,961
TREATMENT OF POROUS BODIES
Filed March 18, 1960

Harold Hubert Chambers
Philip Lorraine Bird
    Inventors

By Stevens Davis Miller & Mosher
    Attorneys

United States Patent Office 3,114,961
Patented Dec. 24, 1963

3,114,961
TREATMENT OF POROUS BODIES
Hubert Harold Chambers, New Malden, and Philip Lorraine Bird, Holmbury St. Mary, England, assignors to Power Jets (Research and Development) Limited, London, England, a British company
Filed Mar. 18, 1960, Ser. No. 16,027
Claims priority, application Great Britain Mar. 20, 1959
4 Claims. (Cl. 29—156.8)

This invention relates to the treatment of porous bodies with a view to effecting a variation in the fluid permeability of such bodies.

One object of the invention is to provide a treatment for porous bodies which is effective to change the permeability of the portions of a porous body lying adjacent its outer skin so that these portions exhibit a permeability different from that of the underlying material. A further object is to effect point-to-point variations in permeability over the surface of a porous body. Both these objects may be achieved simultaneously by one treatment operation.

Porous bodies have been proposed hitherto for a number of purposes. One example is that of a cooled gas turbine blade wherein blade cooling is effected by discharging coolant fluid through the porous blade skin from coolant channels formed within the interior of the blade. It has been proposed that the outer skin of the blade should be constituted by a layer of lower permeability than the underlying layer. It has further been proposed that the permeability of this outer skin should be varied as between different point-to-point positions on the skin in a predetermined manner in order to promote the greatest effusion of coolant at those regions of the blade skin which are subject to the highest stress or where the heat transfer from external gases, under working conditions, is the greatest. Such measures are recommended in British patent specification No. 783,710, and it is estimated that, with pressure air as a coolant fluid, the areas of the blade under highest stress, the leading edge and concave surfaces of the blade, would need to be about fifteen times more permeable than the other areas of the blade skin.

Conventional methods of forming porous bodies, such as the gas turbine blade referred to above, involve pressing metal or ceramic powders upon a solid core member and subsequently sintering the powders until the powder particles are bonded together. The formation of the outer skin and underlying layer of differing permeabilities require two successive pressing operations followed by a single sintering operation. Moreover it is difficult by this means to achieve a predetermined variation in permeability as between different point-to-point regions of the blade skin.

According to the present invention there is provided a method of forming on a porous body of sintered material an outer skin of reduced permeability compared with that of the underlying material in which the body is subjected to a vapour diffusion plating process whereby an element is deposited on and diffused into the surface of the body.

A vapour-diffusion plating process is one in which a material is coated with a metal or element by subjecting it at an elevated temperature to the vapour of a volatile compound of the metal or element. The coating is formed by the simultaneous deposition of the coating metal or element on the surface of the base material and its diffusion into the base material to form a surface alloy or compound. One example of this process is known as siliconising, in which the material to be coated is heated in a nonoxidising, i.e. an inert or reducing gas stream containing silicon tetrachloride vapour. In this case, the diffusion coating may consist of solid solutions of silicon in the base material, or discrete silicides, or both solid solutions and discrete silicides.

Other elements which may be used for coating porous bodies by the vapour-diffusion plating process include boron, chromium, aluminium and zirconium. Many of these give coatings with good engineering properties including resistance to abrasion, corrosion and high temperature oxidation, depending upon the nature of the base material.

According to a feature of the invention the process is so controlled as to give a point-to-point variation in permeability over the surface of the body. This may be effected by at least partly screening during the vapour diffusion process those parts of the surface which are required to have a higher permeability.

The invention will be more fully described with reference to the examples below and to the accompanying diagrammatic drawings of which:

The effect of a vapour diffusion plating process on test pieces will first be described. A test piece in the form of a porous metal disc with plane parallel faces was made from a low carbon 80/20 nickel-chromium alloy by powder metallurgy methods, and its permeability determined for viscous flow of a gas through the discs with the plane parallel faces normal to the direction of flow from the formula:

$$P_e V_e = \frac{\lambda . A}{2 . L . \eta}(P_i^2 - P_e^2)$$

$P_i$ = inlet gas pressure
$P_e$ = outlet gas pressure
$V_e$ = outlet volume rate of gas flow
$A$ = area of plane parallel faces
$L$ = distance between faces
$\eta$ = viscosity of gas
$\lambda$ = permeability coefficient (dimensions $l^2$)

The untreated disc was found to have a gas permeability coefficient of $2.62 \times 10^{-8}$ cms.$^2$.

The disc was heated at 1050° C. in a muffle furnace with one surface only exposed to a gas stream containing 2 parts by volume of silicon tetrachloride vapour and 98 parts by volume of purified hydrogen, the rate of gas flow over the test piece being 144 cms. per minute. After treatment for 15 minutes, the permeability was again determined and was found to have been reduced to $0.92 \times 10^{-8}$ cms.$^2$.

A similar disc exposed to the same treatment under the same conditions for 22½ minutes was found to have had its gas permeability coefficient reduced to $0.26 \times 10^{-8}$ cms.$^2$.

Thus for similar porous bodies, reduction in gas permeability is related directly to the time of processing, and in this way the process can be controlled so as to give a porous body a predetermined permeability.

Diffusion coatings grow partly within the original surface of the base metal and partly outside it. There is an overall increase in linear dimensions which is a function of time of treatment and of temperature. Thus the rate of growth of a solid metal body or the rate of attenuation of fissures and pores in a porous body is controllable and predictable, the controlling factors being time, temperature and concentration of the coating vapour atmosphere.

It has been found that coatings produced by a vapour diffusion process are surprisingly penetrative. For example it has been found in the vapour diffusion plating of solid objects that narrow fissures in the surface which are no wider than 0.0005 inch and extending to a depth of at least 0.012 inch can be completely coated with a coherent layer. Corresponding penetration into the pores of a porous body can be achieved.

Figure 1:
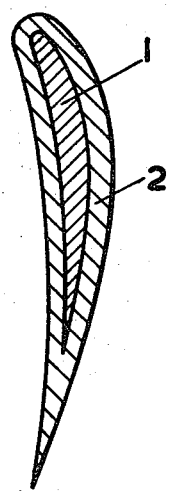
FIGURES 1 and 2 are transverse sectional views through a gas turbine blade before and after treatment.
Figure 2:
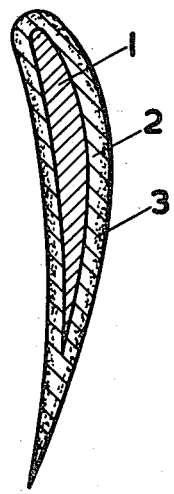

The application of the invention to varying the permeability of effusion cooled turbine blades is illustrated in the drawings. As shown in FIGURE 1, a blade is initially made by forming around a solid, non-porous core 1 a layer 2 of porous material of uniform permeability by a conventional sintering process. The blade is then subjected to a vapour diffusion plating process by exposing it at an elevated temperature to a stream containing a vapour of a compound of the element which it is desired to diffuse into the blade surface. After treatment, the blade is as shown in FIGURE 2 with an outer skin 3 of reduced permeability due to diffusion of the element into the surface of the blade. Thus a blade as described in British patent specification No. 783,710, having a solid non-porous core, an outer skin of relatively low permeability and an intermediate layer of relatively high permeability, can be achieved.

To produce a blade with a point-to-point variation of permeability over the blade surface, the blade (see FIGURE 3) is first made by forming a porous intermediate layer 4 and a porous outer skin 5 around a solid non-porous core 6 by successive pressing and sintering processes in conventional manner, the materials being selected so that the outer skin 5 has a uniform permeability less than that of the intermediate layer 4 but slightly greater than that required at the regions of greatest permeability. In this particular example, maximum cooling is required at the blade leading and trailing edges and on the concave side of the blade, and these regions are therefore required to exhibit greater permeability that the convex surface of the blade. The blade is accordingly set up in an open box 7 partly buried in a non-reactive refractory material 8 so that the aforesaid regions are screened from the gas stream during the diffusion process. A suitable refractory material is alumina powder of particle size which will pass through a 100 mesh B.S. sieve. The refractory material does not form a perfect screen but it does slow down considerably the formation of the coating. Thus the degree of diffusion on the exposed convex side of the blade is greater than in the screened region, and so after treatment the part of the outer skin on the convex side of the blade (as shown in FIGURE 4 at 5a) will have a reduced permeability compared with the remainder of the outer skin.

The screening might alternatively be effected by covering the relevant parts of the blade surface with a slurry of refractory material. A suitable material is alumina powder of a particle size capable of passing a 200 mesh B.S. sieve.

Figure 3:
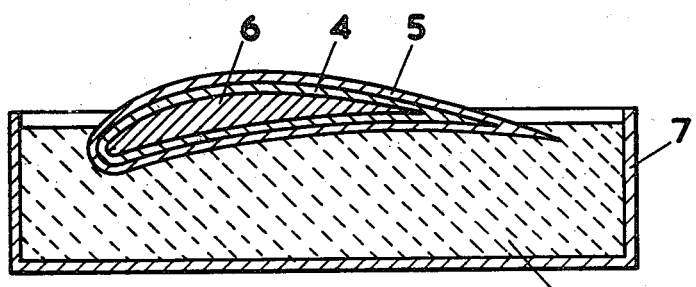
FIGURE 3 shows another gas turbine blade undergoing treatment.
Figure 4:
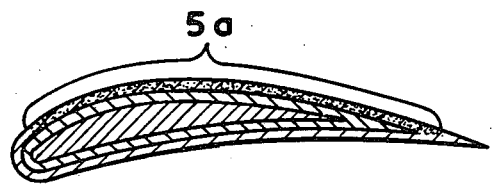
FIGURE 4 shows the blade of FIGURE 3 after treatment.

The blade of FIGURES 3 and 4 could alternatively be made by first forming a single porous layer of uniform permeability around the core, subjecting this layer to a vapour diffusion plating process to produce an outer skin of uniform permeability, less than that of the underlying material but greater than that required in the regions of greater permeability on the blade surface, and finally screening such regions and subjecting the blade to a further vapour diffusion plating process to give a point-to-point variation in permeability.

By suitable adjustment of the screening material the two vapour diffusion plating processes could in some instances be combined.

The process of the present invention is considered to be applicable to most materials commonly used or proposed to be used for gas turbine blades. Thus it could be applied to the usual nickel-, cobalt- and iron-base alloys, to refractory metals such as molybdenum, and to non-metallic ceramic materials. The working conditions of the process will of course vary with the material being treated and with the element or metal being diffused into the surface. Details of such processes are known in the art. In general the working temperature of the process should not be so high that the mechanical properties of the blade material are substantially effected. It is also desirable that the thermal expansion properties of the diffusion coating should be as closely matched as possible to the underlying material so that the coating will not flake off on heating. In the case of diffusion of silicon into nickel and nickel-based alloys, the last-mentioned requirement makes it necessary to aim at the formation of solid solutions of silicon in nickel rather than at the formation of silicides, and the concentration of silicon tetrachloride and the working conditions must accordingly be such that the diffusion is balanced with the deposition, and the silicon concentration in the surface layers of the metal is not allowed to reach a high enough value for the formation of discrete silicides.

In the case of nickel- and cobalt-base alloys, the siliconising process requires the presence of hydrogen, the metal surface catalysing a reaction between the hydrogen and the silicon tetrachloride to release the silicon. With iron- and chromium-base alloys, there is a direct exchange reaction between the metal and the silicon tetrachloride, and the hydrogen can be replaced by an inert gas such as argon or nitrogen.

Normally the compound of the element to be diffused is a halide e.g., silicon tetrachloride, chromous chloride, zirconium chloride, but a passible alternative is a carbonyl.

It may be important that the temperature selected for the treatment be above the vaporising temperature of the waste products in cases where these products are not a permanent gas so that these products may pass out from the treatment chamber. Waste products may be defined as the residual compounds formed during the coating process which may have a deleterious effect on the properties of the coated article. These waste products vary in composition according to the kind of material being treated and/or the nature of the reactions occurring during the coating process; for example, in the case of a chromium alloy article being treated the waste product may include chromium halides.

Although this invention has been described primarily in relation to gas turbine blades, it is to be understood that it is not limited to this application, but could be used for treating other porous bodies. For example, it could be used in the preparation of porous diffusion electrodes for use in electrochemical processes. One possible application is to the electrodes of gaseous fuel cells, that is, electrochemical cells in which the free energy of combustion of a fuel is converted directly into electrical energy.

In one such cell, the porous diffusion electrodes are required to have small pores on the side in contact with the electrolyte and large pores on the side in contact with the gas. This is to prevent flooding of the porous electrode with electrolyte. Each electrode is accordingly made from a solid base plate with inlet and outlet channels machined in the face for the flow of gas. These channels are then filled with a temporary filler and a porous metal layer is pressed and sintered on to this face by powder metallurgy methods, after which the temporary filler is removed. The face of the porous layer is then subjected to a vapour diffusion process as aforesaid to reduce the pore-size of the outer skin.

We claim:

1. A method of forming on a body of porous sintered material an outer skin of reduced permeability compared with that of the underlying material, comprising the step of subjecting the body to a vapour diffusion process whereby an element is deposited on the surface of the body and diffused into the pores therein so as to reduce the permeability of the surface portion of the body.

2. A method of forming on a body of porous sintered material an outer skin of reduced permeability compared with that of the underlying material, the permeability of the outer skin varying over the surface of the body, comprising the steps of at least partly screening that part of the surface which is required to have a higher permeability and subjecting the body to a vapour diffusion process whereby an element is deposited on the unscreened part of the surface and diffused into the pores therein so as to reduce the permeability thereof.

3. A method of forming on a body a porous outer skin, the permeability of which varies over the surface of the body, comprising the steps of forming on the body of a porous layer of sintered material having a uniform permeability greater than the maximum permeability required for the skin, at least partly screening that part of the outer surface of the layer where the higher permeability is required, and subjecting the body to a vapour diffusion process whereby an element is deposited on the unscreened part of the surface and diffused into the pores therein so as to reduce the permeability thereof.

4. A method of forming a fluid permeable turbine blade, the permeability of which varies over the blade surface, comprising the steps of forming around a nonporous core two porous layers of sintered material by succesive pressing and sintering operations, the outer layer having a uniform permeability less than that of the underlying layer but greater than the maximum permeability required for the blade surface, at least partly screening that part of the blade surface where the higher permeability is required, and subjecting the body to a vapour diffusion process whereby an element is deposited on the unscreened part of the surface of the outer layer and diffused into the pores therein so as to reduce the permeability thereof.

References Cited in the file of this patent
UNITED STATES PATENTS

| | | |
|---|---|---|
| 2,109,485 | Ihrig | Mar. 1, 1938 |
| 2,293,843 | Marvin | Aug. 25, 1942 |
| 2,501,051 | Henderson et al. | Mar. 21, 1950 |
| 2,633,628 | Bartlett | Apr. 7, 1953 |
| 2,719,095 | Scanlan | Sept. 27, 1955 |
| 2,898,241 | Charlton | Aug. 4, 1959 |
| 2,946,681 | Probst et al. | July 26, 1960 |
| 3,024,506 | Trimble | Mar. 13, 1962 |

OTHER REFERENCES

Goetzel: Treatise on Powder Metallurgy, vol. 1, Interscience Publishing Inc., 1949, pages 713–715.